(12) United States Patent
Jeon et al.

(10) Patent No.: US 11,378,407 B2
(45) Date of Patent: Jul. 5, 2022

(54) ELECTRONIC APPARATUS AND METHOD FOR IMPLEMENTING SIMULTANEOUS LOCALIZATION AND MAPPING (SLAM)

(71) Applicants: LG Electronics Inc., Seoul (KR); Korea Advanced Institute of Science and Technology, Daejeon (KR)

(72) Inventors: Kyeongjin Jeon, Seoul (KR); Hyukjung Lee, Daejeon (KR); Joohwan Chun, Daejeon (KR); Sungjoo Kim, Seoul (KR)

(73) Assignees: LG Electronics Inc., Seoul (KR); Korea and Advanced Institute of Science and Technology, Daejeon (KR)

( * ) Notice: Subject to any disclaimer, the term of this patent is extended or adjusted under 35 U.S.C. 154(b) by 218 days.

(21) Appl. No.: 16/703,111

(22) Filed: Dec. 4, 2019

(65) Prior Publication Data

US 2021/0055113 A1 Feb. 25, 2021

(30) Foreign Application Priority Data

Aug. 21, 2019 (KR) .......................... 10-2019-0102352

(51) Int. Cl.
*G01C 21/32* (2006.01)
*G06V 20/56* (2022.01)

(52) U.S. Cl.
CPC ............. *G01C 21/32* (2013.01); *G06V 20/56* (2022.01)

(58) Field of Classification Search
CPC ................ G01C 21/32; G01C 21/3837; G06K 9/00791; G06K 9/00664; G06K 9/262; G06K 9/6218; G06T 7/20; G06T 7/70; G06T 2207/30204; G05D 1/0268
See application file for complete search history.

(56) References Cited

U.S. PATENT DOCUMENTS

| | | | |
|---|---|---|---|
| 2012/0039511 A1* | 2/2012 | Oi | G06T 7/70 382/103 |
| 2017/0153326 A1* | 6/2017 | Grewe | G06K 9/00791 |
| 2018/0188037 A1* | 7/2018 | Wheeler | G01C 21/3635 |
| 2020/0142026 A1* | 5/2020 | Bush | G01S 13/89 |
| 2020/0249032 A1* | 8/2020 | Lee | G09B 29/006 |

\* cited by examiner

*Primary Examiner* — Kenneth J Malkowski
(74) *Attorney, Agent, or Firm* — Fish & Richardson P.C.

(57) ABSTRACT

The present disclosure relates to a method of selecting representative measurements from among measurements related to an environment around a movable object and determining whether the representative measurements are associated with landmarks to realize SLAM and an electronic apparatus for the same. One or more of an electronic apparatus, a vehicle, and an autonomous vehicle of the present disclosure may be connected to, for example, an artificial intelligence module, an unmanned aerial vehicle (UAV), a robot, an augmented reality (AR) device, a virtual reality (VR) device, or a 5G service device.

12 Claims, 14 Drawing Sheets

ELECTRONIC APPARATUS AND METHOD FOR IMPLEMENTING SIMULTANEOUS LOCALIZATION AND MAPPING (SLAM)

CROSS-REFERENCE TO RELATED APPLICATION

This application is based on and claims priority under 35 U.S.C. § 119(a) to Korean Patent Application No. 10-2019-0102352, filed on Aug. 21, 2019, the disclosure of which is incorporated herein in its entirety by reference.

BACKGROUND

1. Field

The present disclosure relates to a method and an electronic apparatus of realizing SLAM. More specifically, the present disclosure relates to a method of determining whether measurements related to a surrounding environment are associated with landmarks and realizing SLAM based on the determined result and an electronic apparatus for the same.

2. Description of the Related Art

With Simultaneous Localization and Mapping (SLAM) refers to an operation of constructing a map of an environment around a movable object while measuring a location of the movable object, and an interest in such SLAM is increasing. A considerable amount of calculation is required for realization of SLAM, and there is a need to more efficiently realize SLAM.

An autonomous vehicle refers to a vehicle equipped with an autonomous driving device which is capable of recognizing an environment around the vehicle and a vehicle state and controlling driving of the vehicle based on the recognized result. With the progress of an autonomous vehicle research, various services that may increase user convenience using an autonomous vehicle are also being studied.

SUMMARY

Embodiments disclosed here provide a method and an electronic apparatus of realizing SLAM. Technical subjects to be achieved by the embodiments are not limited to the above-described technical subject, and other technical subjects may be analogized from the following embodiments.

According to one embodiment of the present disclosure, a method of realizing simultaneous localization and mapping (SLAM) includes acquiring measurements related to an environment around a movable object, selecting representative measurements from among the measurements according to a predetermined criterion, determining whether the representative measurements are associated with pre-recognized landmarks, and updating state information for the SLAM based on a result of the determining.

According to another embodiment, an electronic apparatus of realizing simultaneous localization and mapping (SLAM) includes a memory in which at least one program is stored and a processor configured to realize the SLAM by executing the at least one program, and the processor is configured to acquire measurements related to an environment around a movable object, select representative measurements from among the measurements according to a predetermined criterion, determine whether the representative measurements are associated with pre-recognized landmarks, and update state information for the SLAM based on a result of the determination.

According to still another embodiment, a vehicle of realizing simultaneous localization and mapping (SLAM) includes a sensor configured to sense an environment around the vehicle, and a processor configured to acquire measurements related to the environment around the vehicle based on the sensing, select representative measurements from among the measurements according to a predetermined criterion, determine whether the representative measurements are associated with pre-recognized landmarks, and update state information for the SLAM based on a result of the determination.

According to a further embodiment, a computer readable recording medium includes a non-volatile recording medium including a program for executing the method described above in a computer.

Details of other embodiments are included in the following detailed description and the drawings.

According to the present disclosure, although a considerable amount of calculation may be required in a process of determining whether all acquired measurements are associated with pre-recognized landmarks, an electronic apparatus may select representative measurements from among the acquired measurements and determine whether the selected representative measurements are associated with the pre-recognized landmarks, thereby reducing the amount of calculation. Further, by selecting the representative measurements via clustering or using grid cells to determine the presence or absence of association, the electronic apparatus may increase a probability of searching for a new landmark.

In addition, the electronic apparatus may select a preset number of landmarks from among the pre-recognized landmarks based on the Euclidean distance from the representative measurements and determine whether the representative measurements are associated with the selected landmarks, thereby further effectively reducing an amount of calculation required for determination of the presence or absence of association.

Effects of the present disclosure are not limited to the effects mentioned above, and other unmentioned effects may be clearly understood by those skilled in the art from a description of the claims.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
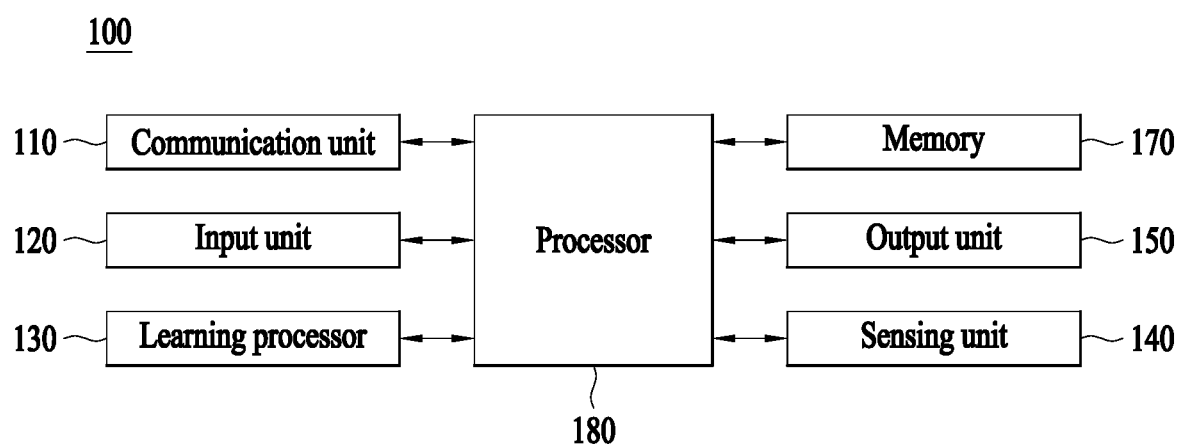
FIG. 1 illustrates an AI device according to an embodiment.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

The terms used in the embodiments are selected, as much as possible, from general terms that are widely used at present while taking into consideration the functions obtained in accordance with the present disclosure, but these terms may be replaced by other terms based on intentions of those skilled in the art, customs, emergency of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

In addition, in this specification, "artificial Intelligence (AI)" refers to the field of studying artificial intelligence or a methodology capable of making the artificial intelligence, and "machine learning" refers to the field of studying methodologies that define and solve various problems handled in the field of artificial intelligence. The machine learning is also defined as an algorithm that enhances performance for a certain operation through a steady experience with respect to the operation.

An "artificial neural network (ANN)" may refer to a general model for use in the machine learning, which is composed of artificial neurons (nodes) forming a network by synaptic connection and has problem solving ability. The artificial neural network may be defined by a connection pattern between neurons of different layers, a learning process of updating model parameters, and an activation function of generating an output value.

The artificial neural network may include an input layer and an output layer, and may selectively include one or more hidden layers. Each layer may include one or more neurons, and the artificial neural network may include a synapse that interconnects neurons. In the artificial neural network, each neuron may output the value of an activation function concerning signals input through the synapse, weights, and deflection thereof.

The model parameters refer to parameters determined by learning, and include weights for synaptic connection and deflection of neurons, for example. Then, hyper-parameters refer to parameters to be set before learning in a machine learning algorithm, and include a learning rate, the number of repetitions, the size of a mini-batch, and an initialization function, for example.

It can be said that the purpose of learning of the artificial neural network is to determine a model parameter that minimizes a loss function. The loss function may be used as an index for determining an optimal model parameter in a learning process of the artificial neural network.

The machine learning may be classified, according to a learning method, into supervised learning, unsupervised learning, and reinforcement learning.

The supervised learning refers to a learning method for an artificial neural network in the state in which a label for learning data is given. The label may refer to a correct answer (or a result value) to be deduced by the artificial neural network when learning data is input to the artificial neural network. The unsupervised learning may refer to a learning method for the artificial neural network in the state in which no label for learning data is given. The reinforcement learning may refer to a learning method in which an agent defined in a certain environment learns to select a behavior or a behavior sequence that maximizes cumulative compensation in each state.

The machine learning realized by a deep neural network (DNN) including multiple hidden layers among artificial neural networks is also called deep learning, and the deep learning is a part of the machine learning. In the following description, the machine learning is used as a meaning including the deep learning.

In addition, in this specification, a vehicle may be an autonomous vehicle. "Autonomous driving" refers to a self-driving technology, and an "autonomous vehicle" refers to a vehicle that performs driving without a user's operation or with a user's minimum operation. In addition, the autonomous vehicle may refer to a robot having an autonomous driving function.

For example, autonomous driving may include all of a technology of maintaining the lane in which a vehicle is driving, a technology of automatically adjusting a vehicle speed such as adaptive cruise control, a technology of causing a vehicle to automatically drive in a given route, and a technology of automatically setting a route, along which a vehicle drives, when a destination is set.

Here, a vehicle may include all of a vehicle having only an internal combustion engine, a hybrid vehicle having both an internal combustion engine and an electric motor, and an electric vehicle having only an electric motor, and may be meant to include not only an automobile but also a train and a motorcycle, for example.

In the following description, embodiments of the present disclosure will be described in detail with reference to the drawings so that those skilled in the art can easily carry out the present disclosure. The present disclosure may be embodied in many different forms and is not limited to the embodiments described herein.

Hereinafter, embodiments of the present disclosure will be described in detail with reference to the drawings.

FIG. 1 illustrates an AI device 100 according to an embodiment of the present disclosure.

AI device 100 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, or a vehicle.

Referring to FIG. 1, AI device 100 may include a communication unit 110, an input unit 120, a learning processor 130, a sensing unit 140, an output unit 150, a memory 170, and a processor 180, for example.

Communication unit 110 may transmit and receive data to and from external devices, such as other AI devices 100a to 100e and an AI server 200, using wired/wireless communication technologies. For example, communication unit 110 may transmit and receive sensor information, user input, learning models, and control signals, for example, to and from external devices.

At this time, the communication technology used by communication unit 110 may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

Input unit 120 may acquire various types of data.

At this time, input unit 120 may include a camera for the input of an image signal, a microphone for receiving an audio signal, and a user input unit for receiving information input by a user, for example. Here, the camera or the microphone may be handled as a sensor, and a signal acquired from the camera or the microphone may be referred to as sensing data or sensor information.

Input unit 120 may acquire, for example, input data to be used when acquiring an output using learning data for model learning and a learning model. Input unit 120 may acquire unprocessed input data, and in this case, processor 180 or learning processor 130 may extract an input feature as pre-processing for the input data.

Learning processor 130 may cause a model configured with an artificial neural network to learn using the learning data. Here, the learned artificial neural network may be called a learning model. The learning model may be used to deduce a result value for newly input data other than the learning data, and the deduced value may be used as a determination base for performing any operation.

At this time, learning processor 130 may perform AI processing along with a learning processor 240 of AI server 200.

At this time, learning processor 130 may include a memory integrated or embodied in AI device 100. Alternatively, learning processor 130 may be realized using memory 170, an external memory directly coupled to AI device 100, or a memory held in an external device.

Sensing unit 140 may acquire at least one of internal information of AI device 100 and surrounding environmental information and user information of AI device 100 using various sensors.

At this time, the sensors included in sensing unit 140 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a LIDAR, and a radar, for example.

Output unit 150 may generate, for example, a visual output, an auditory output, or a tactile output.

At this time, output unit 150 may include, for example, a display that outputs visual information, a speaker that outputs auditory information, and a haptic module that outputs tactile information.

Memory 170 may store data which assists various functions of AI device 100. For example, memory 170 may store input data acquired by input unit 120, learning data, learning models, and learning history, for example.

Processor 180 may determine at least one executable operation of AI device 100 based on information determined or generated using a data analysis algorithm or a machine learning algorithm. Then, processor 180 may control constituent elements of AI device 100 to perform the determined operation.

To this end, processor 180 may request, search, receive, or utilize data of learning processor 130 or memory 170, and may control the constituent elements of AI device 100 so as to execute a predictable operation or an operation that is deemed desirable among the at least one executable operation.

At this time, when connection of an external device is necessary to perform the determined operation, processor 180 may generate a control signal for controlling the external device and may transmit the generated control signal to the external device.

Processor 180 may acquire intention information with respect to user input and may determine a user request based on the acquired intention information.

At this time, processor 180 may acquire intention information corresponding to the user input using at least one of a speech to text (STT) engine for converting voice input into a character string and a natural language processing (NLP) engine for acquiring natural language intention information.

At this time, at least a part of the STT engine and/or the NLP engine may be configured with an artificial neural network learned according to a machine learning algorithm. Then, the STT engine and/or the NLP engine may have learned by learning processor 130, may have learned by learning processor 240 of AI server 200, or may have learned by distributed processing of processors 130 and 240.

Processor 180 may collect history information including, for example, the content of an operation of AI device 100 or feedback of the user with respect to an operation, and may store the collected information in memory 170 or learning processor 130, or may transmit the collected information to an external device such as AI server 200. The collected history information may be used to update a learning model.

Processor 180 may control at least some of the constituent elements of AI device 100 in order to drive an application program stored in memory 170. Moreover, processor 180 may combine and operate two or more of the constituent elements of AI device 100 for the driving of the application program.

Figure 2:
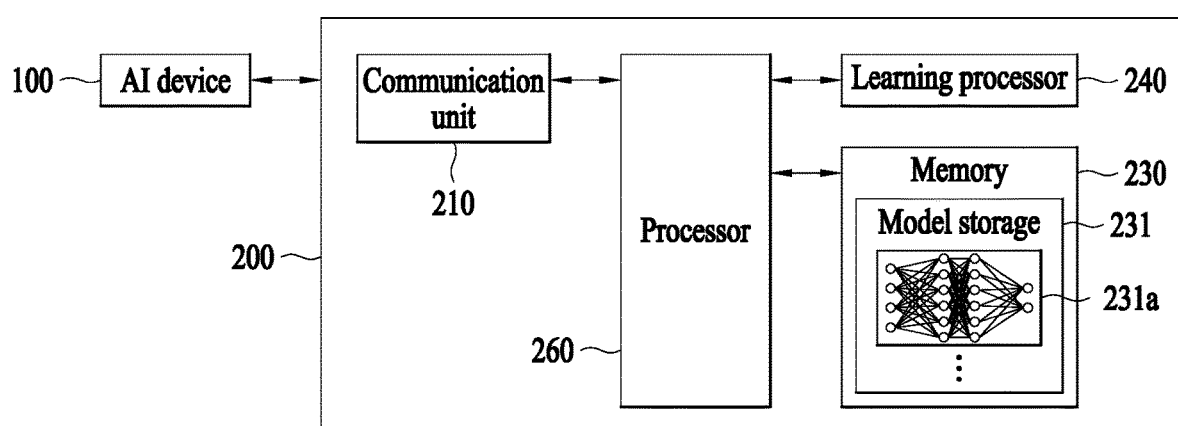
FIG. 2 illustrates an AI server according to an embodiment.

FIG. 2 illustrates AI server 200 according to an embodiment of the present disclosure.

Referring to FIG. 2, AI server 200 may refer to a device that causes an artificial neural network to learn using a machine learning algorithm or uses the learned artificial neural network. Here, AI server 200 may be constituted of multiple servers to perform distributed processing, and may be defined as a 5G network. At this time, AI server 200 may be included as a constituent element of AI device 100 so as to perform at least a part of AI processing together with AI device 100.

AI server 200 may include a communication unit 210, a memory 230, a learning processor 240, and a processor 260, for example.

Communication unit 210 may transmit and receive data to and from an external device such as AI device 100.

Memory 230 may include a model storage unit 231. Model storage unit 231 may store a model (or an artificial neural network) 231a which is learning or has learned via learning processor 240.

Learning processor 240 may cause artificial neural network 231a to learn learning data. A learning model may be used in the state of being mounted in AI server 200 of the artificial neural network, or may be used in the state of being mounted in an external device such as AI device 100.

The learning model may be realized in hardware, software, or a combination of hardware and software. In the case in which a part or the entirety of the learning model is realized in software, one or more instructions constituting the learning model may be stored in memory 230.

Processor 260 may deduce a result value for newly input data using the learning model, and may generate a response or a control instruction based on the deduced result value.

Figure 3:
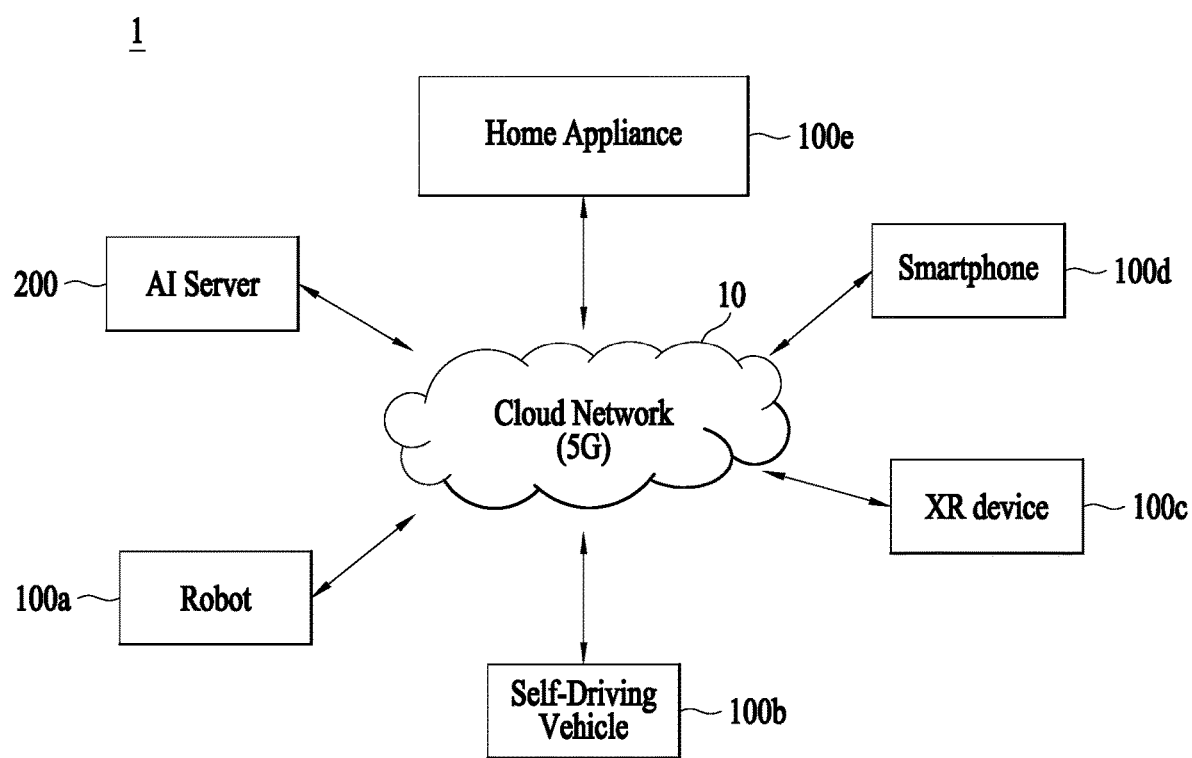
FIG. 3 illustrates an AI system according to an embodiment.

FIG. 3 illustrates an AI system 1 according to an embodiment of the present disclosure.

Referring to FIG. 3, in AI system 1, at least one of AI server 200, a robot 100a, a self-driving vehicle 100b, an XR device 100c, a smart phone 100d, and a home appliance 100e is connected to a cloud network 10. Here, robot 100a, self-driving vehicle 100b, XR device 100c, smart phone 100d, and home appliance 100e, to which AI technologies are applied, may be referred to as AI devices 100a to 100e.

Cloud network 10 may constitute a part of a cloud computing infra-structure, or may mean a network present in the cloud computing infra-structure. Here, cloud network 10 may be configured using a 3G network, a 4G or long term evolution (LTE) network, or a 5G network, for example.

That is, respective devices 100a to 100e and 200 constituting AI system 1 may be connected to each other via cloud network 10. In particular, respective devices 100a to 100e and 200 may communicate with each other via a base station, or may perform direct communication without the base station.

AI server 200 may include a server which performs AI processing and a server which performs an operation with respect to big data.

AI server 200 may be connected to at least one of robot 100a, self-driving vehicle 100b, XR device 100c, smart phone 100d, and home appliance 100e, which are AI devices constituting AI system 1, via cloud network 10, and may assist at least a part of AI processing of connected AI devices 100a to 100e.

At this time, instead of AI devices 100a to 100e, AI server 200 may cause an artificial neural network to learn according to a machine learning algorithm, and may directly store a learning model or may transmit the learning model to AI devices 100a to 100e.

At this time, AI server 200 may receive input data from AI devices 100a to 100e, may deduce a result value for the received input data using the learning model, and may generate a response or a control instruction based on the deduced result value to transmit the response or the control instruction to AI devices 100a to 100e.

Alternatively, AI devices 100a to 100e may directly deduce a result value with respect to input data using the learning model, and may generate a response or a control instruction based on the deduced result value.

Hereinafter, various embodiments of AI devices 100a to 100e, to which the above-described technology is applied, will be described. Here, AI devices 100a to 100e illustrated in FIG. 3 may be specific embodiments of AI device 100 illustrated in FIG. 1.

Self-driving vehicle 100b may be realized into a mobile robot, a vehicle, or an unmanned air vehicle, for example, through the application of AI technologies.

Self-driving vehicle 100b may include an autonomous driving control module for controlling an autonomous driving function, and the autonomous driving control module may mean a software module or a chip realized in hardware. The autonomous driving control module may be a constituent element included in self-driving vehicle 100b, but may be a separate hardware element outside self-driving vehicle 100b so as to be connected to self-driving vehicle 100b.

Self-driving vehicle 100b may acquire information on the state of self-driving vehicle 100b using sensor information acquired from various types of sensors, may detect (recognize) the surrounding environment and an object, may generate map data, may determine a movement route and a driving plan, or may determine an operation.

Here, self-driving vehicle 100b may use sensor information acquired from at least one sensor among a LIDAR, a radar, and a camera in the same manner as robot 100a in order to determine a movement route and a driving plan.

In particular, self-driving vehicle 100b may recognize the environment or an object with respect to an area outside the field of vision or an area located at a predetermined distance or more by receiving sensor information from external devices, or may directly receive recognized information from external devices.

Self-driving vehicle 100b may perform the above-described operations using a learning model configured with at least one artificial neural network. For example, self-driving vehicle 100b may recognize the surrounding environment and the object using the learning model, and may determine a driving line using the recognized surrounding environment information or object information. Here, the learning model may be directly learned in self-driving vehicle 100b, or may be learned in an external device such as AI server 200.

At this time, self-driving vehicle 100b may generate a result using the learning model to perform an operation, but may transmit sensor information to an external device such as AI server 200 and receive a result generated by the external device to perform an operation.

Self-driving vehicle 100b may determine a movement route and a driving plan using at least one of map data, object information detected from sensor information, and object information acquired from an external device, and a drive unit may be controlled to drive self-driving vehicle 100b according to the determined movement route and driving plan.

The map data may include object identification information for various objects arranged in a space (e.g., a road) along which autonomous driving vehicle 100b drives. For example, the map data may include object identification information for stationary objects, such as streetlights, rocks, and buildings, and movable objects such as vehicles and pedestrians. Then, the object identification information may include names, types, distances, and locations, for example.

In addition, self-driving vehicle 100b may perform an operation or may drive by controlling the drive unit based on user control or interaction. At this time, self-driving vehicle 100*b* may acquire interactional intention information depending on a user operation or voice expression, and may determine a response based on the acquired intention information to perform an operation.

Figure 4:
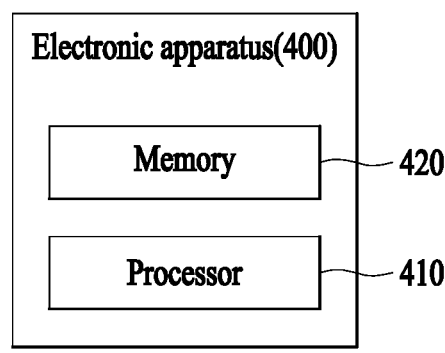
FIG. 4 illustrates an electronic apparatus according to the present disclosure.

FIG. 4 illustrates an electronic apparatus according to the present disclosure.

An electronic apparatus 400 may include a processor 410 and a memory 420. In FIG. 4, only components of electronic apparatus 400 according to the embodiments are illustrated. Thus, it may be apparent to those skilled in the art that electronic apparatus 400 may further include other general purpose components other than the components illustrated in FIG. 4.

Electronic apparatus 400 may realize simultaneous localization and mapping (SLAM). In other words, electronic apparatus 400 may generate a map of an environment around a movable object while recognizing a location of the movable object. In a process of realizing SLAM, electronic apparatus 400 may set state information for SLAM, and may repeatedly update the state information using a probability filter. For example, the probability filter may be an extended Kalman filter. According to an embodiment, electronic apparatus 400 may be included in the movable object. The movable object may be a robot or a vehicle without a limitation thereto, and may also be any other movable object.

Processor 410 serves to control general functions of electronic apparatus 400 for realizing SLAM. For example, processor 410 controls electronic apparatus 400 as a whole by executing programs stored in memory 420 in electronic apparatus 400. Processor 410 may be realized, for example, as a central processing unit (CPU), a graphics processing unit (GPU), or an application processor (AP) provided in electronic apparatus 400 without a limitation thereto.

Memory 420 may be hardware that stores various data to be processed in electronic apparatus 400. Memory 420 may store data processed in electronic apparatus 400 and data to be processed in electronic apparatus 400. Memory 420 may further store, for example, applications and drivers to be driven by electronic apparatus 400. Memory 420 may include a random access memory (RAM) such as a dynamic random access memory (DRAM) or a static random access memory (SRAM), a read-only memory (ROM), an electrically erasable programmable read-only memory (EEPROM), a CD-ROM, a Blu-ray or any other optical disk storage, a hard disk drive (HDD), a solid state drive (SSD), or a flash memory.

Processor 410 may acquire measurements related to an environment around the movable object. Specifically, gwh sensors disposed on the movable object may sense a surrounding environment during movement of the movable object, and processor 410 may acquire measurements related to the surrounding environment from sensed results of the sensors. For example, a radar sensor disposed on the movable object may detect positions of arbitrary points within the surrounding environment, and processor 410 may acquire coordinates of the positions of the points as measurements.

Processor 410 may select representative measurements from among the acquired measurements according to a predetermined criterion.

In an example, processor 410 may classify measurements, which are acquired in advance, into multiple clusters, and may select representative measurements recognized from the respective clusters. Specifically, processor 410 may perform clustering of measurements, which are acquired in advance, based on a predetermined Euclidean distance. For example, processor 410 may recognize, as one cluster, measurements within the radius of 1 m, from among measurements acquired in advance. Processor 410 may recognize, as a representative measurement, a measurement having a largest signal to noise ratio (SNR), from among the measurements included in each of the clusters. For example, processor 410 may recognize, as a representative measurement of a first cluster, a measurement having a largest SNR from among the measurements in the first cluster. A more specific example may be described below with reference to FIG. 5.

In another example, processor 410 may select grid cells each including more than a preset number of measurements from among grid cells related to a surrounding environment. Specifically, processor 410 may represent a surrounding environment as grid cells each having a predetermined magnitude, and may select grid cells including more than a preset number of measurements from among the grid cells. Next, processor 410 may recognize representative measurements of the respective selected grid cells. For example, processor 410 may select grid cells each having five or more measurements from among the grid cells related to the surrounding environment, and may recognize, as a representative measurement of a first grid cell, a measurement having a largest SNR, from among the measurements of the first grid cell among the selected grid cells. A more specific example may be described below with reference to FIG. 6. According to another embodiment, processor 410 may recognize, as representative grid cells, grid cells each including more than a preset number of measurements, and based on a cell unit, may determine whether the representative grid cells are associated with pre-recognized landmarks.

Processor 410 may determine whether the representative measurements are associated with the pre-recognized landmarks. Specifically, processor 410 may determine whether the representative measurements are measured due to at least one of the pre-recognized landmarks or whether the representative measurements are measured due to at least one of new landmarks.

Processor 410 may select a preset number of representative landmarks from among the pre-recognized landmarks in consideration of the Euclidean distance from the representative measurements, and may determine whether the representative measurements are associated with the representative landmarks. Specifically, processor 410 may select a preset number of first representative landmarks having a short Euclidean distance from a first representative measurement among the representative measurements. Next, processor 410 may determine whether the first representative measurement is associated with the first representative landmarks in consideration of a Mahalanobis distance from the first representative measurement. Processor 410 may determine whether an SNR of the first representative measurement is higher than a predetermined threshold. When the first representative measurement is not associated with the first representative landmarks and the SNR of the first representative measurement is higher than a first threshold, processor 410 may recognize the first representative measurement as a new landmark. Processor 410 may add information on the first representative measurement to state information for SLAM. In other words, processor 410 may perform a state augmentation process using the first representative measurement. A more specific example may be described below with reference to FIG. 7.

Then, processor 410 may select a preset number of representative measurements from among the representative measurements in consideration of the Euclidean distance from the pre-recognized landmarks, and may determine whether the preset number of selected representative measurements are associated with the pre-recognized landmarks. For example, processor 410 may select ten representative measurements having an SNR equal to or greater than a predetermined threshold and a short Euclidean distance from the pre-recognized landmarks, and may determine whether the ten representative measurements are associated with the pre-recognized landmarks.

Accordingly, since a considerable amount of calculation may be required in a process of determining whether all of the acquired measurements are associated with the pre-recognized landmarks, electronic apparatus 400 may reduce the amount of calculation required for determination of the presence or absence of association by a process of selecting representative measurements from among acquired measurements and determining whether the selected representative measurements are associated with pre-recognized landmarks. Further, by selecting representative measurements via clustering or using grid cells and determining the presence or absence of association, electronic apparatus 400 may increase a probability of searching for a new landmark.

In addition, by selecting a preset number of landmarks from among the pre-recognized landmarks based on the Euclidean distance from the representative measurements and determining whether the selected landmarks are associated with the representative measurements, electronic apparatus 400 may further effectively reduce the amount of calculation required for determination of the presence or absence of association.

Figure 5:
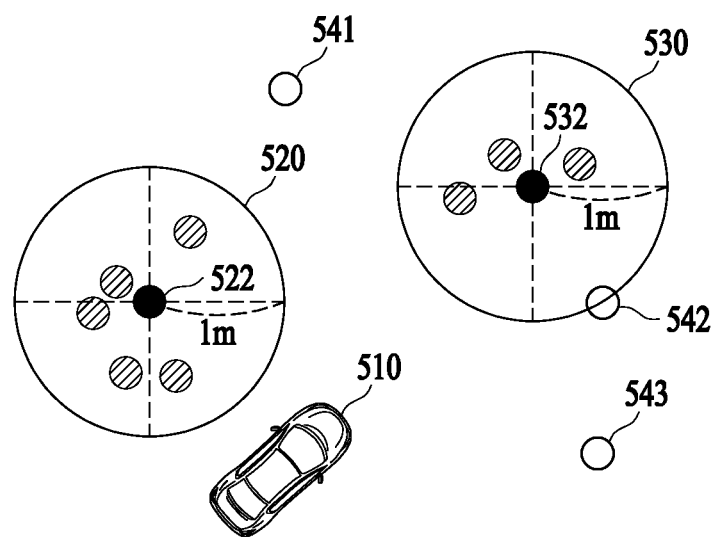
FIG. 5 illustrates one embodiment in which a processor selects representative measurements from among measurements.

FIG. 5 illustrates one embodiment in which the processor selects representative measurements from among measurements.

As illustrated in FIG. 5, processor 410 may acquire measurements related to an environment around a vehicle 510 which is a movable object. Next, processor 410 may recognize, as a first cluster 520 and a second cluster 530, measurements within the radius of 1 m among the acquired measurements.

Processor 410 may recognize, as a representative measurement of first cluster 520, a measurement 522 having a largest SNR among six measurements included in first cluster 520. Processor 410 may recognize, a representative measurement of second cluster 530, a measurement 532 having a largest SNR among four measurements included in second cluster 530.

Processor 410 may recognize, as noises, measurements 541, 542 and 543 not included in first cluster 520 and second cluster 530, among the acquired measurements.

Figure 6:
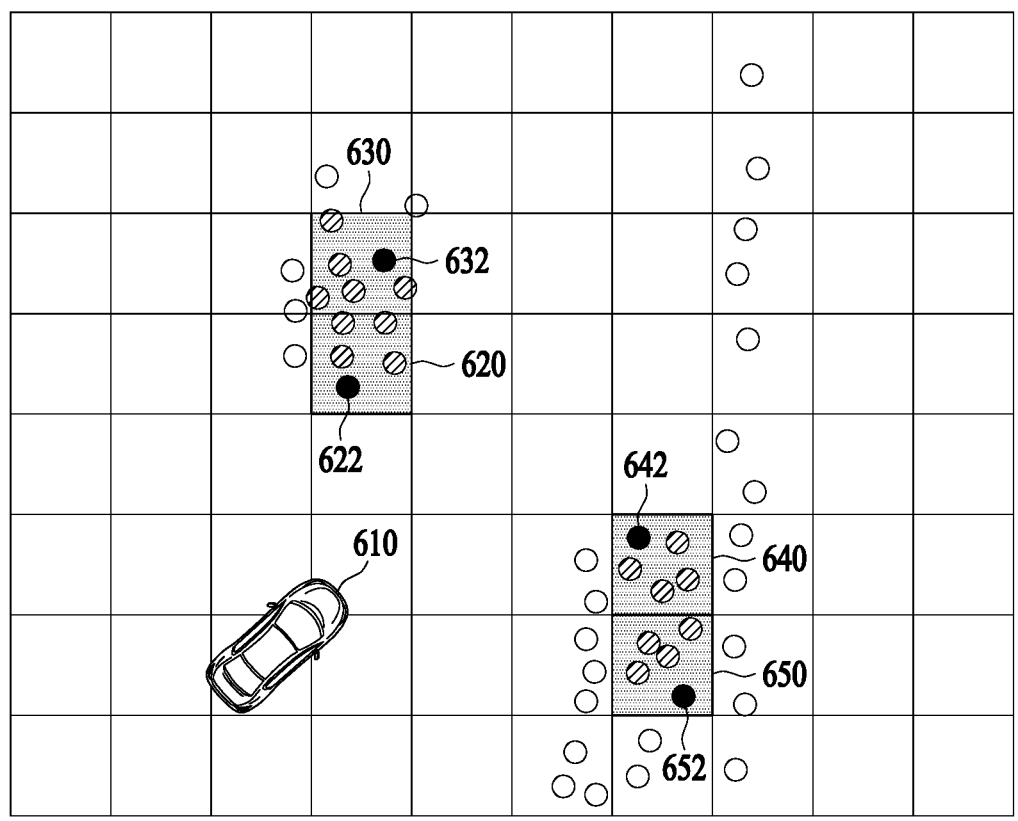
FIG. 6 illustrates another embodiment in which the processor selects representative measurements from among measurements.

FIG. 6 illustrates still another embodiment in which the processor selects representative measurements from among measurements.

As illustrated in FIG. 6, processor 410 may acquire measurements related to an environment around a vehicle 610 which is a movable object. Processor 410 may represent the surrounding environment as grid cells each having a predetermined magnitude. Processor 410 may select grid cells 620, 630, 640 and 650 each including five or more measurements from among the grid cells in FIG. 6.

Figure 7:
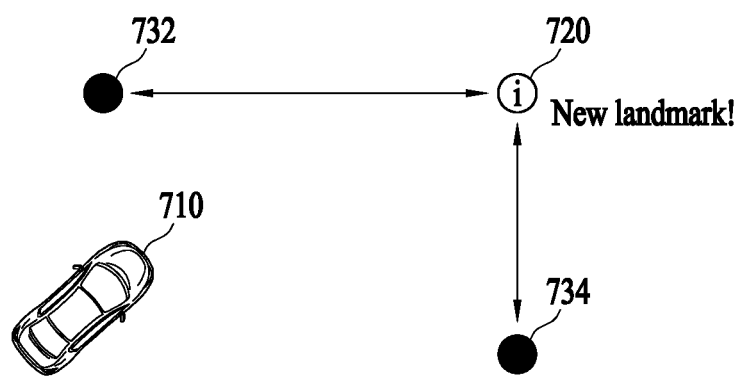
FIG. 7 illustrates an embodiment in which the processor recognizes a measurement as a new landmark.

Processor 410 may recognize representative measurements 622, 632, 642 and 652 of respective grid cells 620, 630, 640 and 650. Specifically, processor 410 may recognize, as a representative measurement of grid cell 620, measurement 622 having a largest SNR among five measurements of grid cell 620, may recognize, as a representative measurement of grid cell 630, measurement 632 having a largest SNR among six measurements of grid cell 630, may recognize, as a representative measurement of grid cell 640, measurement 642 having a largest SNR among five measurements of grid cell 640, and may recognize, as a representative measurement of grid cell 650, measurement 652 having a largest SNR among five measurements of grid cell 650, FIG. 7 illustrates an embodiment in which the processor recognizes a measurement as a new landmark.

Processor 410 may recognize a representative measurement 720 among measurements related to an environment around a vehicle 710 which is a movable object. Processor 410 may select a preset number of representative landmarks 732 and 734 from among pre-recognized landmarks in consideration of the Euclidean distance from representative measurement 720.

Processor 410 may determine whether representative measurement 720 is associated with representative landmarks 732 and 734. According to an embodiment, processor 410 may determine whether representative measurement 720 is associated with representative landmarks 732 and 734 in consideration of the Mahalanobis distance from representative measurement 720. Specifically, processor 410 may determine similarity between representative measurement 720 and representative landmark 732 and similarity between representative measurement 720 and representative landmark 734 via a log-likelihood test. Then, processor 410 may determine whether an SNR of representative measurement 720 is higher than a predetermined threshold. When representative measurement 720 is not associated with representative landmarks 732 and 734 and the SNR of representative measurement 720 is higher than the predetermined threshold, processor 410 may recognize representative measurement 720 as a new landmark. Processor 410 may add coordinates of a position of representative measurement 720 to a state vector for SLAM.

Referring again to FIG. 4, processor 410 may select representative measurements from among acquired measurements based on the Euclidean distance from pre-recognized landmarks. For example, processor 410 may select, as representative measurements, measurements, a distance of which from pre-recognized landmarks is less than 2 m. A more specific embodiment may be described below with reference to FIG. 8. Processor 410 may select, as representative measurements, measurements having an SNR higher than a predetermined threshold from among acquired measurements.

Processor 410 may determine whether the selected representative measurements are associated with the pre-recognized landmarks. Processor 410 may select a preset number of representative landmarks from among the pre-recognized landmarks recognized in consideration of the Euclidean distance from the representative measurements. Next, processor 410 may determine whether the representative measurements are associated with the representative landmarks. Specifically, processor 410 may select a preset number of first representative landmarks having a short Euclidean distance from a first representative measurement among the representative measurements. Next, processor 410 may determine whether the first representative measurement is associated with the first representative landmarks in consideration of the Mahalanobis distance from the first representative measurement. Processor 410 may further determine whether an SNR of the first representative measurement is higher than a predetermined threshold.

Processor 410 may update state information for SLAM based on the result of determining whether the representative measurements are associated with the landmarks. In other words, processor 410 may perform a measurement update process which is one process of SLAM based on the result of determination of the presence or absence of association. The state information for SLAM may include information on a location and direction of a movable object and information on locations of pre-recognized landmarks. For example, when a first representative measurement is associated with a specific landmark among first landmarks and an SNR of the first representative measurement is higher than a predetermined threshold, processor 410 may update state information for SLAM based on the first representative measurement. Specifically, processor 410 may update information on a location and direction of a movable object and information on a location of a specific landmark based on location information of the first representative measurement. A more specific embodiment may be described with reference to FIG. 9.

Processor 410 may update state information for SLAM based on odometer information which is information on movement of a movable object. In other words, processor 410 may perform prediction which is one process of SLAM. Specifically, a sensor in a movable object may sense a speed and direction of the movable object, and processor 410 may acquire, as odometer information, information on the speed and direction of the movable object from the sensor. Next, processor 410 may update information on a location and direction of the movable object and information on landmarks based on the odometer information.

Figure 8:
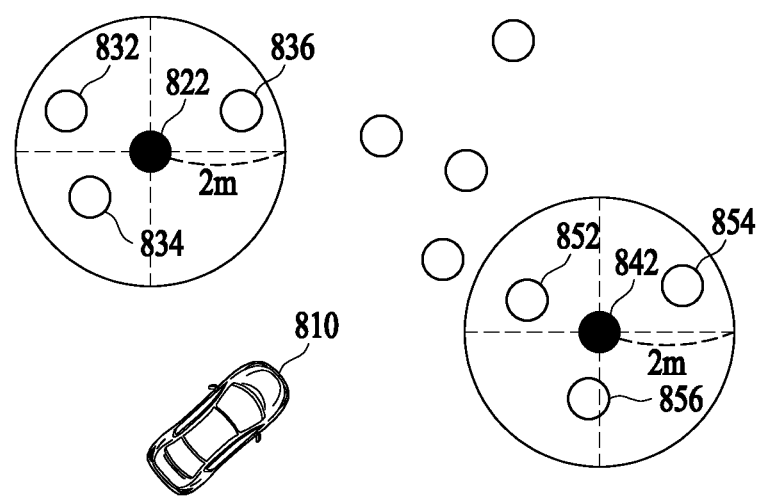
FIG. 8 illustrates still another embodiment in which the processor selects representative measurements from among measurements.

FIG. 8 illustrates still another embodiment in which the processor selects representative measurements from among measurements.

As illustrated in FIG. 8, processor 410 may acquire measurements related to an environment around a vehicle 810 which is a movable object. Next, processor 410 may select representative measurements from among the acquired measurements based on the Euclidean distance from pre-recognized landmarks. Specifically, processor 410 may select, as representative measurements, measurements 832, 834 and 836 within a distance of 2 m from a landmark 822, and may select, as representative measurements, measurements 852, 854 and 856 within a distance of 2 m from a landmark 842.

Figure 9:
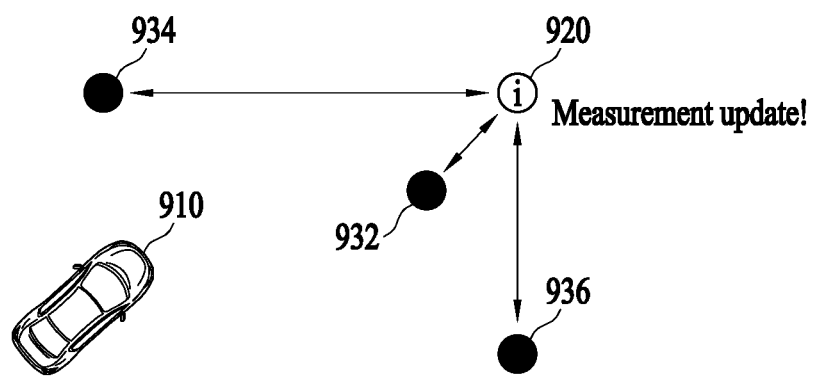
FIG. 9 illustrates an embodiment in which the processor determines whether representative measurements are associated with landmarks.

FIG. 9 illustrates an embodiment in which the processor determines whether representative measurements are associated with landmarks.

Processor 410 may recognize a representative measurement 920 among measurements related to an environment around a vehicle 910 which is a movable object. Processor 410 may select a preset number of representative landmarks 932, 934 and 936 from among pre-recognized landmarks in consideration of the Euclidean distance from representative measurement 920.

Processor 410 may determine whether representative measurement 920 is associated with representative landmarks 932, 934 and 936. According to an embodiment, processor 410 may determine whether representative measurement 920 is associated with representative landmarks 932, 934 and 936 in consideration of the Mahalanobis distance from representative measurement 920. Specifically, processor 410 may determine similarity between each of representative landmarks 932, 934 and 936 and representative measurement 920 via a log-likelihood test. Processor 410 may determine whether an SNR of representative measurement 920 is higher than a predetermined threshold. When representative measurement 920 is associated with representative landmark 932 and the SNR of representative measurement 920 is higher than the predetermined threshold, processor 410 may update state information for SLAM based on representative measurement 920 and representative landmark 932. For example, processor 410 may update location information of representative landmark 932 based on location information of representative measurement 920.

Referring again to FIG. 4, processor 410 may recognize a landmark which is not updated for a predetermined period, and may delete state information on the recognized landmark from state information for SLAM. Specifically, processor 410 may repeatedly update state information upon realization of SLAM, and may delete state information on a specific landmark from a state vector and a covariance matrix for SLAM when information on the specific landmark is not updated for a predetermined period.

Accordingly, by deleting state information for a landmark which is not updated for a predetermined period from state information for SLAM, electronic apparatus 400 may efficiently manage a memory area with regard to the state information.

Figure 10:
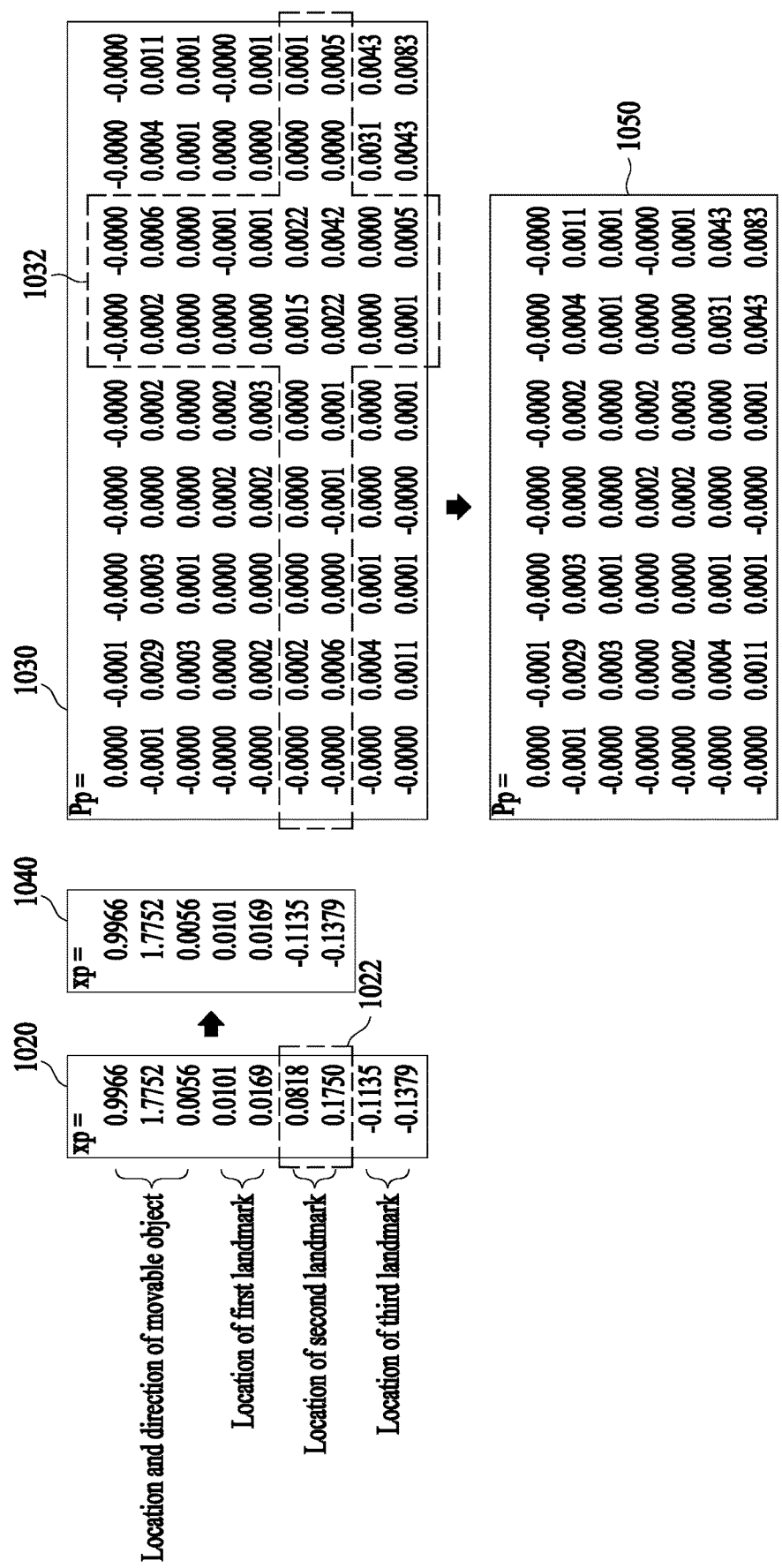
FIG. 10 illustrates an embodiment in which the processor deletes information on a recognized landmark from state information for SLAM.

FIG. 10 illustrates an embodiment in which the processor deletes information on a recognized landmark from state information for SLAM.

Processor 410 may repeatedly and periodically update a state vector 1020 and a covariance matrix 1030 which are state information upon realization of SLAM.

Processor 410 may recognize that state information on a second landmark among landmarks is not updated for a predetermined period. For example, processor 410 may recognize that the second landmark is not updated for the predetermined period based on a count value which increases whenever state information on the landmark is updated.

Next, processor 410 may remove state information on the second landmark from state vector 1020 and covariance matrix 1030. Specifically, processor 410 may remove state information 1022 on the second landmark from state vector 1020 to update state vector 1020 into a state vector 1040. Processor 410 may remove state information 1032 on the second landmark from covariance matrix 1030 to update covariance matrix 1030 into a covariance matrix 1050.

Figure 11:
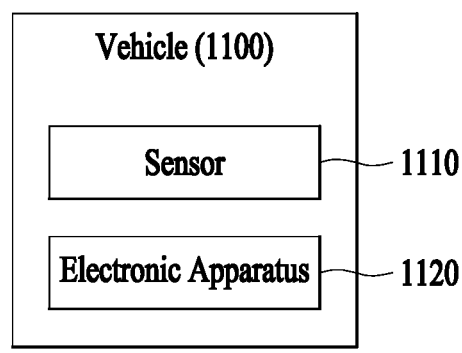
FIG. 11 illustrates a vehicle according to the present disclosure.

FIG. 11 illustrates a vehicle according to the present disclosure.

Vehicle 1100 may include a sensor 1110 and an electronic apparatus 1120. In FIG. 11, only components of vehicle 1100 according to the present embodiment are illustrated. Thus, it may be understood by those skilled in the art that other general purpose components of the present embodiment may be included, in addition to the components illustrated in FIG. 11.

Vehicle 1100 may be an autonomous vehicle.

Sensor 1110 may sense an environment around vehicle 1100. For example, sensor 1110 may include a global positioning system (GPS), an inertial measurement unit (IMU), an RADAR unit, an LIDAR unit, and a camera, and may sense the environment around vehicle 1100.

Electronic apparatus 1120 may acquire measurements related to the environment around vehicle 1100 based on sensing of sensor 1110, may select representative measurements from among the acquired measurements according to a predetermined criterion, may determine whether the representative measurements are associated with pre-recognized landmarks, and may update state information for SLAM based on the determined result. Electronic apparatus 1120 may correspond to electronic apparatus 400 of FIGS. 4 to 10, and a repeated description thereof may be omitted.

Figure 12:
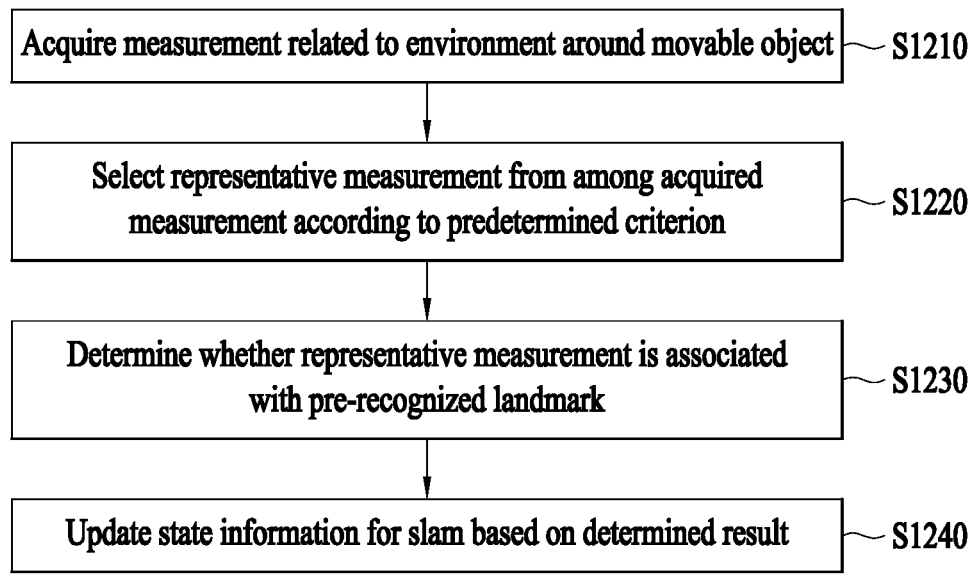
FIG. 12 is a view for explaining a method of realizing SLAM by the electronic apparatus.

FIG. 12 is a view for explaining a method of realizing SLAM by the electronic apparatus.

The method illustrated in FIG. 12 may be performed by the respective components of electronic apparatus 400 of FIGS. 4 to 10, and a repeated description thereof may be omitted.

In step S1210, electronic apparatus 400 may acquire measurements related to an environment around a movable object.

In step S1220, electronic apparatus 400 may select representative measurements from among the acquired measurements according to a predetermined criterion. In one example, electronic apparatus 400 may classify the acquired measurements into multiple clusters and may select representative measurements recognized from the respective clusters. In another example, electronic apparatus 400 may select grid cells each including more than a preset number of measurements of from among grid cells related to the surrounding environment, and may select representative measurements recognized from the respective selected grid cells.

Electronic apparatus 400 may select the representative measurements from among the acquired measurements based on the Euclidean distance from the pre-recognized landmarks.

In step S1230, electronic apparatus 400 may determine whether the representative measurements are associated with pre-recognized landmarks.

Electronic apparatus 400 may select a preset number of representative landmarks from among pre-recognized landmarks in consideration of the Euclidean distance from the representative measurements, and may determine whether the representative measurements are associated with the representative landmarks. Electronic apparatus 400 may recognize, as new landmarks, the representative measurements when the representative measurements are not associated with the representative landmarks.

Electronic Apparatus 400 may determine whether the selected representative measurements are associated with the pre-recognized landmarks. Electronic Apparatus 400 may select a preset number of representative landmarks from among the pre-recognized landmarks in consideration of the Euclidean distance from the representative measurements. Next, electronic apparatus 400 may determine whether the representative measurements are associated with representative landmarks.

In step S1240, electronic apparatus 400 may update state information for SLAM based on the determined result of step S1230.

When the representative measurements are associated with the representative landmarks, electronic apparatus 400 may update state information for SLAM based on the representative measurements. Specifically, when a first representative measurement among the representative measurements is associated with a specific landmark among first representative landmarks and an SNR of the first representative measurement is higher than a predetermined threshold, electronic apparatus 400 may update state information for SLAM based on the first representative measurement.

Electronic apparatus 400 may update state information for SLAM based on odometer information which is information on movement of a movable object.

Figure 13:
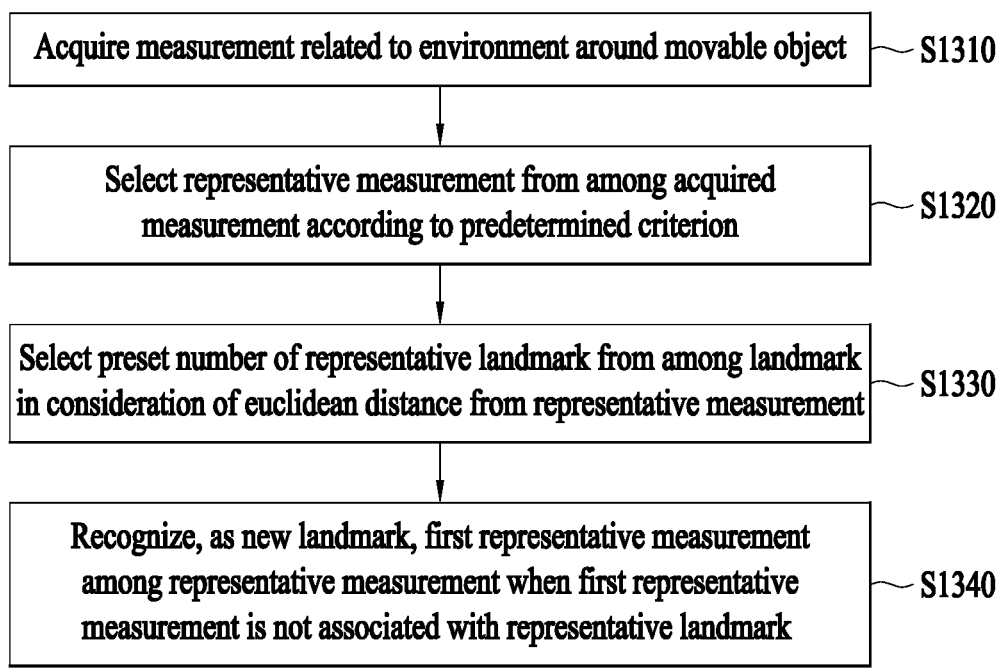
FIG. 13 illustrates one embodiment of realization of SLAM by the electronic apparatus.

FIG. 13 illustrates one embodiment of realization of SLAM by the electronic apparatus.

A method illustrated in FIG. 13 may be performed by the respective components of electronic apparatus 400 of FIGS. 4 to 10, and a repeated description thereof may be omitted.

In step S1310, electronic apparatus 400 may acquire measurements related to an environment around a movable object.

In step S1320, electronic apparatus 400 may select representative measurements from among the acquired measurements according to a predetermined criterion.

In step S1330, electronic apparatus 400 may select a preset number of representative landmarks from among landmarks in consideration of the Euclidean distance from the representative measurements.

In step S1340, when a first representative measurement among the representative measurements is not associated with the preset number of representative landmarks, electronic apparatus 400 may recognize the first representative measurement as a new landmark.

Figure 14:
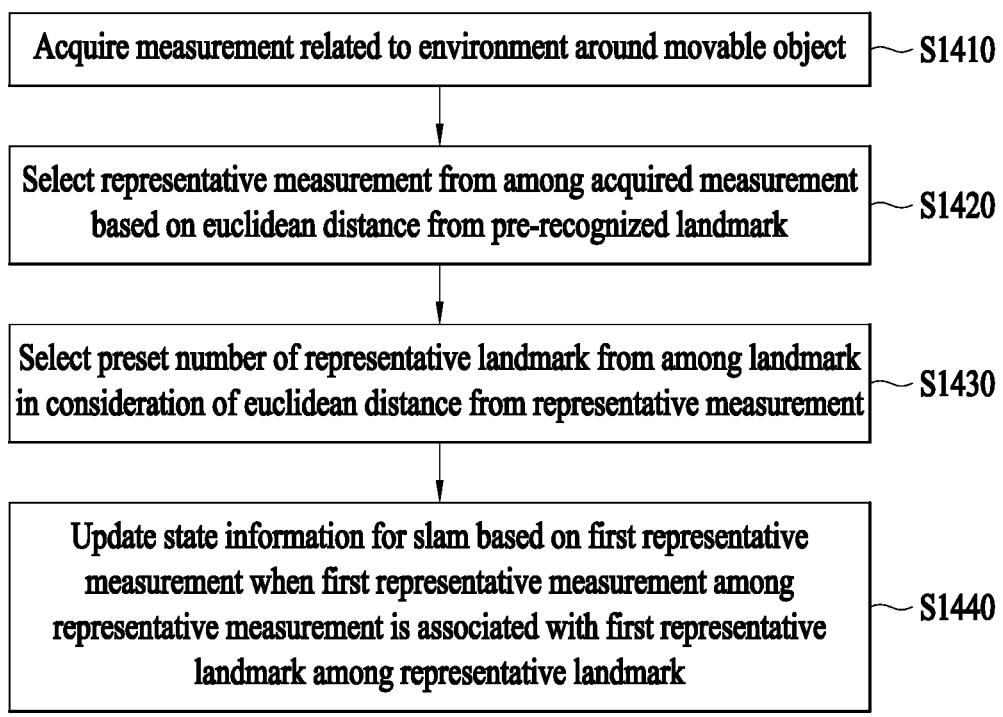
FIG. 14 illustrates another embodiment of realization of SLAM by the electronic apparatus.

FIG. 14 illustrates another embodiment of realization of SLAM by the electronic apparatus.

A method illustrated in FIG. 14 may be performed by the respective components of electronic apparatus 400 of FIGS. 4 to 10, and a repeated description thereof may be omitted.

In step S1410, electronic apparatus 400 may acquire measurements related to an environment around a movable object.

In step S1420, electronic apparatus 400 may select representative measurements from among the acquired measurements based on the Euclidean distance from pre-recognized landmarks.

In step S1430, electronic apparatus 400 may select a preset number of representative landmarks from among the landmarks in consideration of the Euclidean distance from the representative measurements.

In step S1440, when a first representative measurement among the representative measurements is associated with a first representative landmark among the representative landmarks, electronic apparatus 400 may update state information for SLAM based on the first representative measurement.

The apparatus described above may comprise a processor, a memory for storing program data and executing it, a permanent storage such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable recording medium. Examples of the computer readable recording medium include magnetic storage media (e.g., ROM, RAM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor.

The present embodiment may be described in terms of functional block components and various processing steps. Such functional blocks may be realized by any number of hardware and/or software components configured to perform the specified functions. For example, the present disclosure may employ various integrated circuit (IC) components, e.g., memory elements, processing elements, logic elements, look-up tables, and the like, which may carry out a variety of functions under the control of one or more microprocessors or other control devices. Similarly, where the elements of the present disclosure are implemented using software programming or software elements, the present disclosure may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, the present disclosure could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for Simultaneous Localization and Mapping (SLAM), the method comprising:
    acquiring, through a sensor of a movable object, a plurality of measurements associated with an environment surrounding the movable object, the plurality of measurements corresponding to a plurality of points within the environment;
    selecting one or more representative measurements from the plurality of measurements according to a predetermined criterion;
    determining whether the one or more representative measurements are associated with one or more pre-recognized landmarks; and
    based on the determination of whether the one or more representative measurements are associated with the one or more pre-recognized landmarks, updating SLAM state information,
        wherein the determining of whether the one or more representative measurements are associated with one or more pre-recognized landmarks comprises:
            selecting a preset number of representative landmarks from the one or more pre-recognized landmarks based on respective Euclidean distances between one or more points corresponding to the one or more representative measurements and the one or more pre-recognized landmarks; and
            determining whether the one or more representative measurements are associated with the selected representative landmarks,
        wherein the determining of whether the one or more representative measurements are associated with the selected representative landmarks comprises:
            calculating Mahalanobis distances between one of the one or more representative measurements and the selected representative landmarks;
            based on the calculated Mahalanobis distances, determining that the one of the one or more representative measurements is not associated with the selected representative landmarks;
            determining that a signal to noise ratio (SNR) of the one of the one or more representative measurements is higher than a predetermined threshold, and
            based on the determination that (1) the one of the one or more representative measurements is not associated with the selected representative landmarks and (2) the SNR of the one of the one or more representative measurements is higher than the predetermined threshold, determining that the one of the one or more representative measurements is a new landmark.

2. The method of claim 1, wherein the predetermined criterion comprises Euclidean distances between each of the plurality of points corresponding to the plurality of measurements and the pre-recognized landmarks.

3. The method of claim 2, wherein the determining whether the one or more representative measurements are associated with the selected representative landmarks comprises:
    calculating Mahalanobis distances between one of the one or more representative measurements and the selected representative landmarks;
    based on the calculated Mahalanobis distances, determining that the one of the one or more representative measurements is associated with one of the selected representative landmarks; and
    determining that a signal to noise ratio (SNR) of the one of the one or more representative measurements is higher than a predetermined threshold, and
    wherein the updating comprises:
        based on the determination that (1) the one of the one or more representative measurements is associated with one of the selected representative landmarks and (2) the SNR of the one of the one or more representative measurements is higher than the predetermined threshold, updating the SLAM state information based on the one of the one or more representative measurements.

4. The method of claim 1, further comprising:
    determining that one of the one or more pre-recognized landmarks has not been updated for a predetermined period; and
    based on the determination that the one of the one or more pre-recognized landmarks has not been updated for the predetermined period, deleting information associated with the determined one of the one or more pre-recognized landmarks from the SLAM state information.

5. The method of claim 1, wherein the SLAM state information comprises location information and direction information of the movable object, and location information of the pre-recognized landmarks.

6. A non-volatile computer-readable medium storing instructions which, when executed by at least one processor, causes the at least one processor to perform the method of claim 1.

7. An apparatus implementing Simultaneous Localization and Mapping (SLAM), the apparatus comprising:
    at least one processor; and
    a non-volatile computer-readable medium coupled to the at least one processor having stored thereon instructions which, when executed by the at least one processor, causes the at least one processor to perform operations comprising:
        acquiring, through a sensor of a movable object, a plurality of measurements associated with an environment surrounding the movable object, the plurality of measurements corresponding to a plurality of points within the environment;

selecting one or more representative measurements from the plurality of measurements according to a predetermined criterion;

determining whether the one or more representative measurements are associated with one or more pre-recognized landmarks; and based on the determination of whether the one or more representative measurements are associated with the one or more pre-recognized landmarks, updating SLAM state information, wherein the determining of whether the one or more representative measurements are associated with one or more pre-recognized landmarks comprises:

selecting a preset number of representative landmarks from the one or more pre-recognized landmarks based on respective Euclidean distances between one or more points corresponding to the one or more representative measurements and the one or more pre-recognized landmarks; and determining whether the one or more representative measurements are associated with the selected representative landmarks, wherein the determining of whether the one or more representative measurements are associated with the selected representative landmarks comprises:

calculating Mahalanobis distances between one of the one or more representative measurements and the selected representative landmarks;

based on the calculated Mahalanobis distances, determining that the one of the one or more representative measurements is not associated with the selected representative landmarks;

determining that a signal to noise ratio (SNR) of the one of the one or more representative measurements is higher than a predetermined threshold; and based on the determination that (1) the one of the one or more representative measurements is not associated with the selected representative landmarks and (2) the SNR of the one of the one or more representative measurements is higher than the predetermined threshold, determining that the one of the one or more representative measurements is a new landmark.

8. The apparatus of claim 7, wherein the predetermined criterion comprises Euclidean distances between each of the plurality of points corresponding to the plurality of measurements and the pre-recognized landmarks.

9. The apparatus of claim 8, wherein the determining whether the one or more representative measurements are associated with the selected representative landmarks comprises:

calculating Mahalanobis distances between one of the one or more representative measurements and the selected representative landmarks;

based on the calculated Mahalanobis distances, determining that the one of the one or more representative measurements is associated with one of the selected representative landmarks; and determining that a signal to noise ratio (SNR) of the one of the one or more representative measurements is higher than a predetermined threshold, and wherein the updating comprises:

based on the determination that (1) the one of the one or more representative measurements is associated with one of the selected representative landmarks and (2) the SNR of the one of the one or more representative measurements is higher than the predetermined threshold, updating the SLAM state information based on the one of the one or more representative measurements.

10. The apparatus of claim 7, wherein the operations comprise:

determining that one of the one or more pre-recognized landmarks has not been updated for a predetermined period; and based on the determination that the one of the one or more pre-recognized landmarks has not been updated for the predetermined period, deleting information associated with the determined one of the one or more pre-recognized landmarks from the SLAM state information.

11. The apparatus of claim 7, wherein the SLAM state information comprises location information and direction information of the movable object, and location information of the pre-recognized landmarks.

12. A vehicle implementing Simultaneous Localization and Mapping (SLAM), the vehicle comprising:

a sensor configured to sense an environment around the vehicle; and the apparatus of claim 7, wherein the movable object is the vehicle.

* * * * *